United States Patent
Cañete Martinez et al.

(10) Patent No.: US 11,831,722 B2
(45) Date of Patent: Nov. 28, 2023

(54) FUNCTIONS AND METHODS FOR HANDLING PRE-CONFIGURED PROFILES FOR SETS OF DETECTION AND ENFORCEMENT RULES

(71) Applicant: Telefonaktiebolaget LM Ericsson (publ), Stockholm (SE)

(72) Inventors: Antonio Cañete Martinez, Madrid (ES); Miguel Angel Muñoz De La Torre Alonso, Madrid (ES); Carlos Jimenez Cordon, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 37 days.

(21) Appl. No.: 17/414,035

(22) PCT Filed: Dec. 20, 2018

(86) PCT No.: PCT/EP2018/086333
§ 371 (c)(1),
(2) Date: Jun. 15, 2021

(87) PCT Pub. No.: WO2020/126009
PCT Pub. Date: Jun. 25, 2020

(65) Prior Publication Data
US 2022/0353336 A1  Nov. 3, 2022

(51) Int. Cl.
*H04L 67/141* (2022.01)
*H04L 47/24* (2022.01)
(Continued)

(52) U.S. Cl.
CPC ............ *H04L 67/141* (2013.01); *H04L 41/08* (2013.01); *H04L 41/50* (2013.01); *H04L 47/24* (2013.01); *H04W 76/10* (2018.02)

(58) Field of Classification Search
CPC ....... H04L 67/141; H04L 41/08; H04L 41/50; H04L 47/24; H04W 76/10
See application file for complete search history.

(56) References Cited

U.S. PATENT DOCUMENTS 10,484,911 B1 * 11/2019 Bogineni .............. H04W 76/10
2018/0192390 A1   7/2018 Li et al.
(Continued)

OTHER PUBLICATIONS

3rd Generation Partnership Project, "Technical Specification Group Core Network and Terminals; Interface between the Control Plane and the User Plane Nodes; Stage 3 (Release 15)", 3GPP TS 29.244 V15.2.0, Jun. 1, 2018, pp. 1-176.
(Continued)

*Primary Examiner* — Ramy M Osman
(74) *Attorney, Agent, or Firm* — SAGE PATENT GROUP

(57) ABSTRACT

The embodiments herein relate to a method performed by a UPF (303) for handling pre-configured profiles for sets of detection and enforcement rules. The UPF (303) comprises one or more pre-configured profiles applicable to any user session. Each pre-configured profile comprises a set of detection and enforcement rules. Each pre-configured profile comprises a profile ID and the set of detection or enforcement rules. The UPF (303) receives, from a CPF (301) a first request for session establishment comprising at least one indication for profile activation. The at least one indication profile activation comprises the profile ID of the pre-configured profile to be activated. The UPF (303) establishes the session indicated in the first request. For the established session, the UPF (303) activates the at least one pre-configured profile identified by the profile ID by instantiating the set of detection and enforcement rules for the pre-configured profile.

8 Claims, 7 Drawing Sheets

(51) Int. Cl.
*H04W 76/10* (2018.01)
*H04L 41/50* (2022.01)
*H04L 41/08* (2022.01)

(56) References Cited

U.S. PATENT DOCUMENTS

| | | | |
|---|---|---|---|
| 2018/0352483 | A1 | 12/2018 | Youn et al. |
| 2019/0075431 | A1* | 3/2019 | Albasheir ............... H04L 67/52 |
| 2019/0109823 | A1* | 4/2019 | Qiao ....................... H04L 47/24 |
| 2019/0174573 | A1* | 6/2019 | Velev .................. H04L 12/1407 |
| 2019/0182385 | A1* | 6/2019 | Yan ....................... H04W 76/11 |
| 2019/0215724 | A1* | 7/2019 | Talebi Fard .......... H04W 48/16 |
| 2020/0053531 | A1* | 2/2020 | Myhre ................... H04W 48/18 |
| 2020/0059992 | A1* | 2/2020 | Skog ....................... H04L 45/38 |
| 2020/0186462 | A1* | 6/2020 | D'Acunto ............... H04L 67/14 |
| 2020/0267606 | A1* | 8/2020 | Huang-Fu .......... H04W 36/0044 |
| 2021/0400146 | A1* | 12/2021 | Muñoz De La Torre Alonso ....... H04L 41/5029 |

OTHER PUBLICATIONS

3rd Generation Partnership Project, "Technical Specification Group Services and System Aspects; Study on encrypted traffic detection and verification (Release 16)", 3GPP TR 23.787 V0.2.0, Mar. 1, 2018, pp. 1-16.

3rd Generation Partnership Project, "Technical Specification Group Services and System Aspects; System Architecture for the 5G System; Stage 2 (Release 15)", 3GPP TS 23.501 V15.4.0, Dec. 1, 2018, pp. 1-236.

\* cited by examiner

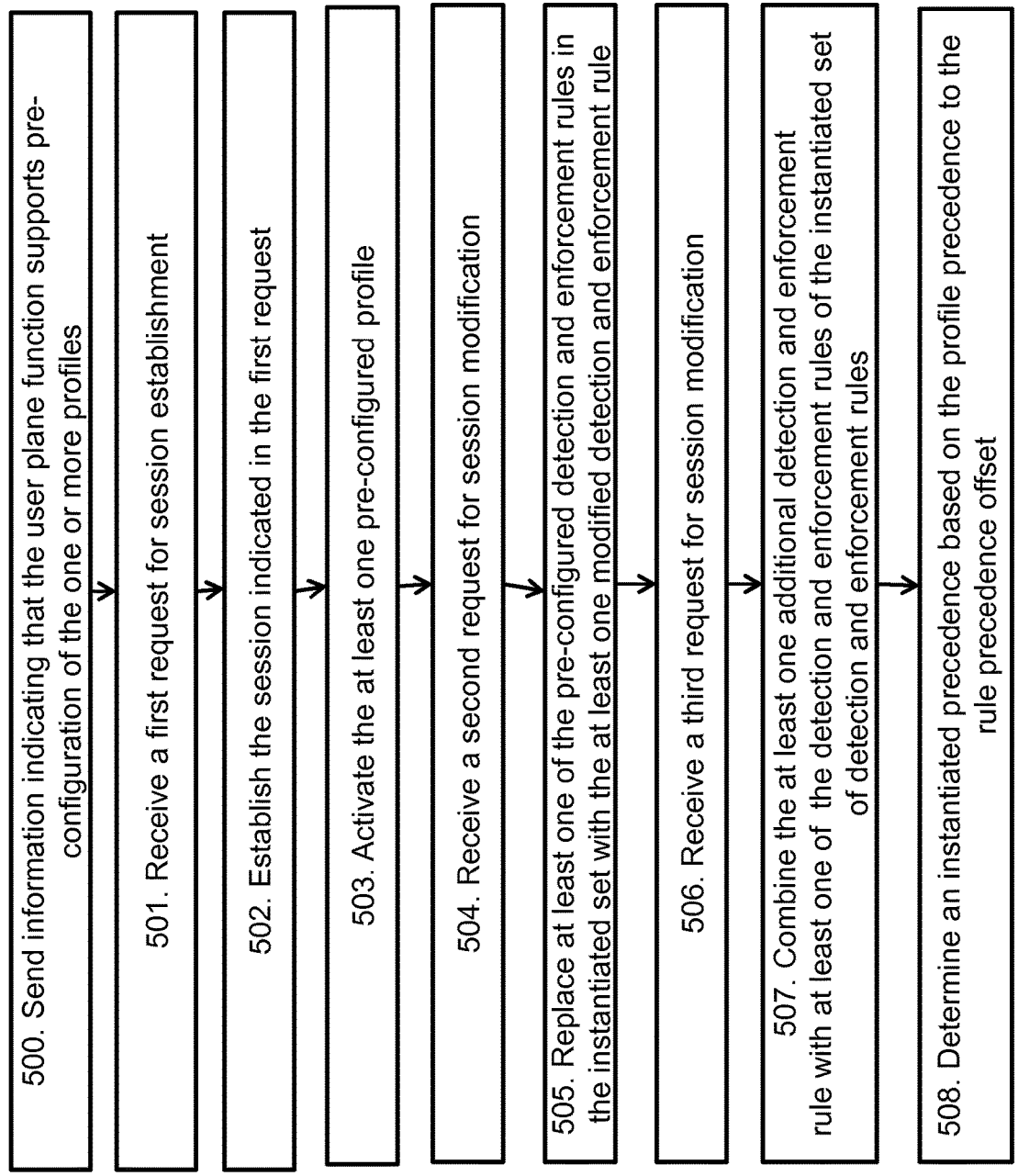

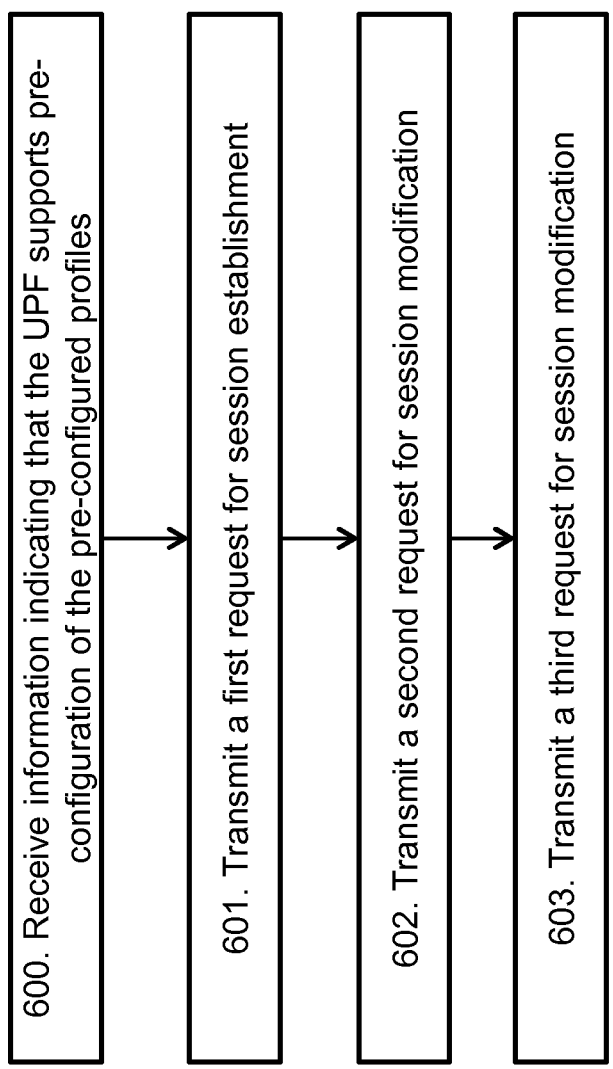

FUNCTIONS AND METHODS FOR HANDLING PRE-CONFIGURED PROFILES FOR SETS OF DETECTION AND ENFORCEMENT RULES

TECHNICAL FIELD

Embodiments herein relate generally to a User Plane Function (UPF), a method performed by the UPF, a Control Plane Function (CPF) and a method performed by the CPF. More particularly the embodiments herein relate to handling pre-configured profiles for sets of detection and enforcement rules.

BACKGROUND

Control and user plane separation (CUPS) enables a flexible placement of the separated control plane (CP) and user plane (UP) functions for supporting diverse deployment scenarios, e.g. central or distributed user plane function. CUPS is present in both Fourth Generation (4G) and Fifth Generation (5G) Third Generation Partnership Project (3GPP) communications systems, and may also be present in any future generations. In general, the control plane handles signalling procedures and the user plane handles packet forwarding.

FIG. 1 shows the architecture reference model for 4G in the case of separation between control plane and user plane, i.e. the separation of the Serving Gateway (SGW), Packet Data Network Gateway (PGW) and Traffic Detection Function (TDF) control and user planes. Sx is the interface between the user plane and the control plane in 4G. This architecture reference model in FIG. 1 covers non-roaming as well as home routed and local breakout roaming scenarios. FIG. 1 shows a SGW-Control plane function (SGW-C) 101c connected to a Serving Gateway User plane function (SGW-U) 101u via an Sxa interface. The SGW-C 101c is connected to a PGW Control plane function (PGW-C) 103c via a S8/8-C interface. The PGW-C 103c is connected to a Packet Data Network Gateway User plane function (PGW-U) 103u via an Sxb interface. The PGW-U 103a is connected to the SGW-U 101u via a S5/8-u interface. The PGW-U 103u is connected to a TDF User plane function (TDF-U) 105u via a SGi interface. The TDF-U 105u is connected to a Traffic Detection Function Control plane function (TDF-C) 105c via an Sxc interface. The TDF-U 105u is connected to the operator's Internet Protocol (IP) services 108, e.g. IP Multimedia Subsystem (IMS), Packet Switch Streaming (PSS) etc. via a SGi interface. The TDF-U 105a and the TDF-C may be optional entities.

The SGW-C 101c comprises the interfaces S11 and S4-C which are interfaces to entities not shown in FIG. 1 The SGW-U 101u comprises the interfaces S12, S4-U and S1-U to entities not shown in FIG. 1. The PGW-U 103u comprises the interfaces Gn/Gp-U, S2a-U and S2b-U to entities not shown in FIG. 1. The PGW-C 103c comprises the interfaces Gn/Gp-C, S2a-C, S2b-C, Gx, Gy, Gz and S6b to entities not shown in FIG. 1. The TDF-C 105c comprises the interfaces Sd, Gyn and Gzn to entities not shown in FIG. 1.

Even though FIG. 1 shows that the CP and UP functions of all SGW, PGW and TDF are split, there may be cases where not all of them are necessarily split. Note that the SGW and PGW may be merged, and in such case the Sxa and Sxb interfaces are combined.

FIG. 2 shows the architecture reference model for 5G Core Network (5GC) in the case of separation between control plane and user plane, i.e. the control plane and user plane separation between the Session Management Function (SMF) and the User Plane Function (UPF). N4 is the interface between the user plane and control plane in 5G. FIG. 2 shows a Unified Data Repository (UDR) 201 with a Nudr interface. FIG. 2 shows a Network Exposure Function (NEF) 203 having a Nnef interface. Furthermore, FIG. 2 shows a Network Data Analytics Function (NWDAF) 205 with an Nnwdaf interface, and an Access Function (AF) 208 with a Naf interface. FIG. 2 shows a Policy Control Function (PCF) 210 with an Npcf interface. The PCF 210 is connected to a charging system represented by the Online Charging System (OCS) 213 via a N28 interface. FIG. 2 shows an Access and Mobility Management Function (AMF) 215 with a Namf interface, and a SMF 218 with a Nsmf interface. The SMF 218 is connected to a UPF 220 via a N4 interface.

In the following, when the abbreviation UPF is used, it is referred to the user plane function in general, not necessarily the UPF 220 in the 5G architecture. When explicitly referring to the UPF in the 5G architecture, this will be explicitly stated and the reference number 220 will also be used. So, in the following the UPF may be any of the SGW-U 101u, PGW-U 103u, TDF-U 105u and UPF 220.

Packet Forwarding Control Protocol (PFCP) is protocol used between the user plane and the control plane, i.e. it is used on the Sx interface in 4G and the N4 interface in 5G. The PFCP is one of the enablers of CUPS in both 4G and 5G. Summarized, the PFCP is used on the following interfaces:

4G:
  Sxa—between the SGW-C 101c and the SGW-U 101u.
  Sxb—between the PGW-C 103c and the PGW-U 103u.
  Sxc—between TDF-C 105c and the TDF-U 105u.
5G:
  N4—between the SMF 218 and the UPF 220.

A PFCP session refers to both Sx and/or N4 sessions.

The CPF controls the processing of the packets in the UPF by establishing, modifying or deleting PFCP Session contexts and by provisioning a set of rules in Sx sessions for 4G or in N4 sessions for 5G for instructing the UPF how to process certain traffic. These rules may be referred to as detection and enforcement rules. A rule may also be referred to as an instruction or guidance on how something should be executed or performed. The rules may be for example Packet Detection Rules (PDR) for packets inspection, Forwarding Action Rules (FAR) for packets handling (e.g. forward, duplicate, buffer, drop), Qos Enforcement Rules (QER) to enforce QoS policing on the packets, Usage Reporting Rules (URR) for measuring the traffic usage, and/or Buffering Action Rules (BARs) per PFCP session context. In 4G, a PFCP session context may correspond to an individual Protocol Data Unit (PDN) connection, a TDF session, or a standalone session not tied to any PDN connection or TDF session used e.g. for forwarding Radius, Diameter or DHCP signalling between the PGW-C and the PDN. IN 5G, a PFCP session context may correspond to an individual PDU session or a standalone PFCP session not tied to any PDU session.

Each PDR comprises Packet Detection Information (PDI), i.e. one or more match fields against which incoming packets are matched, and may be associated to the following rules providing the set of instructions to apply to packets matching the PDI:

one FAR, which contains instructions related to the processing of the packets, specifically forward, duplicate, drop or buffer the packet with or without notifying the CP function about the arrival of a Downlink (DL) packet zero, one or more QERs, which contains instructions related to the QoS enforcement of the traffic;

zero, one or more URRs, which contains instructions related to traffic measurement and reporting.

zero, one or more BARs, which contains instructions related to packet buffering.

A FAR, a QER and a URR shall only be associated to one or multiple PDRs of the same PFCP session context.

In CUPS, the UPF reports to the CPF the capabilities it supports. The capabilities may also be referred to as features. The current standardized UPF capabilities are shown in Table 1 below:

TABLE 1

UPF features

| Feature Octet/Bit | Feature | Interface | Description |
|---|---|---|---|
| 5/1 | BUCP | Sxa, N4 | Downlink Data Buffering in CP function is supported by the UP function. |
| 5/2 | DDND | Sxa, N4 | The buffering parameter 'Downlink Data Notification Delay' is supported by the UP function. |
| 5/3 | DLBD | Sxa, N4 | The buffering parameter 'DL Buffering Duration' is supported by the UP function. |
| 5/4 | TRST | Sxb, Sxc, N4 | Traffic Steering is supported by the UP function. |
| 5/5 | FTUP | Sxa, Sxb, N4 | F-TEID allocation/release in the UP function is supported by the UP function. |
| 5/6 | PFDM | Sxb, Sxc, N4 | The PFD Management procedure is supported by the UP function. |
| 5/7 | HEEU | Sxb, Sxc, N4 | Header Enrichment of Uplink traffic is supported by the UP function. |
| 5/8 | TREU | Sxb, Sxc, N4 | Traffic Redirection Enforcement in the UP function is supported by the UP function. |
| 6/1 | EMPU | Sxa, Sxb, N4 | Sending of End Marker packets supported by the UP function. |
| 6/2 | PDIU | Sxa, Sxb, Sxc, N4 | Support of PDI optimised signalling in UP function. |
| 6/3 | UDBC | Sxb, Sxc, N4 | Support of UL/DL Buffering Control |
| 6/4 | QUOAC | Sxb, Sxc, N4 | The UP function supports being provisioned with the Quota Action to apply when reaching quotas. |
| 6/5 | TRACE | Sxa, Sxb, Sxc, N4 | The UP function supports Trace |
| 6/6 | FRRT | Sxb, N4 | The UP function supports Framed Routing. |

Feature Octet/Bit: The octet and bit number within the Supported-Features IE, e.g. "5/1".
Feature: A short name that can be used to refer to the octet/bit and to the feature.
Interface: A list of applicable interfaces to the feature.
Description: A clear textual description of the feature.

The current PFCP protocol specifies that PDRs must be installed in the UPF by the CPF at session establishment/modification through Sx or N4 signalling.

The current configurations for traffic classification in non-CUPS architecture may include detection rules in the range of 20,000 number of rules. Sending such a large number of PDRs at session establishment for every active subscriber is not only very consuming in terms of signaling bandwidth, but it may also delay the completion of session establishment and therefore degrade the perceived quality of service.

The problem gets aggravated since not only PDRs need to be provisioned in every session, but also FARs, URRs, QERs and BARs connected to them.

It also puts a big load on the CPF, which might be overwhelmed by this amount of work, and will need to be engaged in the process for a long time until all PDRs are established. This will result in a further need for scalability in the CPF, leading to increased Capital Expenditure (CAPEX).

Therefore, there is a need to at least mitigate or solve this issue.

SUMMARY

An objective of embodiments herein is therefore to obviate at least one of the above disadvantages and to provide improved handling of detection and enforcement rules.

According to a first aspect, the object is achieved by a method performed by a UPF for handling pre-configured profiles for sets of detection and enforcement rules. The UPF comprises one or more pre-configured profiles applicable to any user session. Each pre-configured profile comprises a set of detection and enforcement rules. Each pre-configured profile comprises a profile ID for identifying the pre-configured profile and the set of detection or enforcement rules for the pre-configured profile. The UPF receives, from a CPF, a first request for session establishment comprising at least one indication for profile activation for each pre-configured profile to be activated. The at least one indication profile activation comprises the profile ID of the pre-configured profile to be activated. The UPF establishes the session indicated in the first request. For the established session, the UPF activates the at least one pre-configured profile identified by the profile ID by instantiating the set of detection and enforcement rules for the pre-configured profile.

According to a second aspect, the object is achieved by a method performed by a CPF for handling pre-configured profiles for sets of detection and enforcement rules. The CPF transmits, to a UPF, a first request for session establishment comprising at least one indication for profile activation for at least one pre-configured profile to be activated. The indication for profile activation comprises a profile ID of the pre-configured profile to be activated.

According to a third aspect, the object is achieved by a UPF. The UPF comprises one or more pre-configured profiles applicable to any user session. Each pre-configured profile comprises a set of detection and enforcement rules. Each pre-configured profile comprises a profile ID for identifying the pre-configured profile and the set of detection or enforcement rules for the pre-configured profile. The UPF is adapted to receive, from a CPF, a first request for session establishment comprising at least one indication for profile activation for each pre-configured profile to be activated. The at least one indication profile activation comprises the profile ID of the pre-configured profile to be activated. The UPF is adapted to establish the session indicated in the first request. The UPF is adapted to, for the established session, activate the at least one pre-configured profile identified by the profile ID by instantiating the set of detection and enforcement rules for the pre-configured profile.

According to a fourth aspect, the object is achieved by a CPF being adapted to transmit, to a UPF, a first request for session establishment comprising at least one indication for profile activation for at least one pre-configured profile to be activated. The indication for profile activation comprises a profile ID of the pre-configured profile to be activated Since the one or more profile each with a set of detection and enforcement rules is pre-configured in the UPF, the handling of detection and enforcement rules is improved.

Embodiments herein afford many advantages, of which a non-exhaustive list of examples follows:

One advantage of the embodiments herein is that signaling for bulk PDR, FAR, URR, QER and BAR provisioning is optimized. The associated bandwidth is also minimized.

Another advantage of the embodiments herein is that the session establishment time and the associated Central Processing (CPU) and memory usage for both the CPF and the UPF is minimized.

A further advantage for the embodiments herein is that the scalability needs for CPF are minimized, resulting in reduced Capital Expenditures (CAPEX).

An advantage of the embodiments herein is that the traffic detection configurations can be provisioned once and then applied to all sessions, minimizing configuration effort and memory usage.

Another advantage of the embodiments herein is that static and dynamic traffic handling data can be combined in the same session.

Furthermore, an advantage of the embodiments herein is that bulk provisioning can be performed simultaneously with ongoing traffic handling.

Another advantage of the embodiments herein is that they allow interoperability between different network vendors as it is based on PFCP protocol extensions.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail by way of example only in the following detailed description by reference to the appended drawings illustrating the embodiments and in which:

FIG. 5 is a flow chart illustrating an embodiment of a method performed by the UPF.

FIG. 6 is a flow chart illustrating an embodiment of a method performed by the CPF.

The drawings are not necessarily to scale and the dimensions of certain features may have been exaggerated for the sake of clarity. Emphasis is instead placed upon illustrating the principle of the embodiments herein.

DETAILED DESCRIPTION

Figure 3:
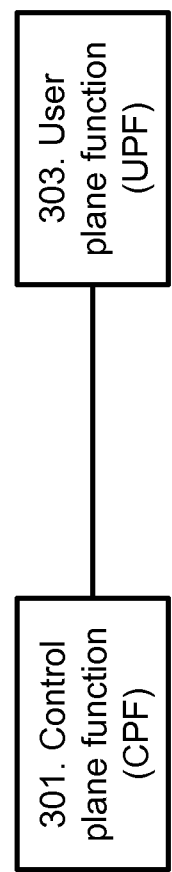
FIG. 3 is schematic block diagram illustrating a communication system.

FIG. 3 depicts a communications system 300 in which embodiments herein may be implemented. The communications system 300 may in some embodiments apply to one or more radio access technologies such as for example General Packet Radio Services (GPRS), Universal Mobile Telecommunications System (UMTS) Terrestrial Radio Access Network (UTRAN), Evolved-UTRAN (E-UTRAN) (4G), New Radio (NR) (5G), or any other suitable 3GPP and non-3GPP radio access technology such as e.g. Wireless Local Area Network (WLAN), or other radio access technologies.

The communications system 300 comprises a CPF 301 which is adapted to be connected to a UPF 303. The CPF 301 may be for example a SGW-C 101c, PGW-C 103c or a TDF-C 105c if the communications system 300 is a 4G system, or a SMF 218 if the communications system 300 is a 5G system. The UPF 303 may be for example a SGW-U 101u, PGW-U 103u or a TDF-U 105u if the communications system 300 is a 4G system, or it may be a UPF if the communications system 300 is a 5G system. Note that these are only examples of the CPF 301 and UPF 303, and that any other suitable nodes, units or function is equally applicable. The CPF 301 may be referred to as a CPF node and the UPF 303 may be referred to as an UPF node. The CPF 301 and the UPF 303 may be a single node or a separate node.

The CPF 301 and the UPF 303 are adapted to be connected to each other and to communicate with each other over an interface. The interface may be an Sx interface, an N4 interface or any other suitable interface which enables such connection and communication.

Figure 1:
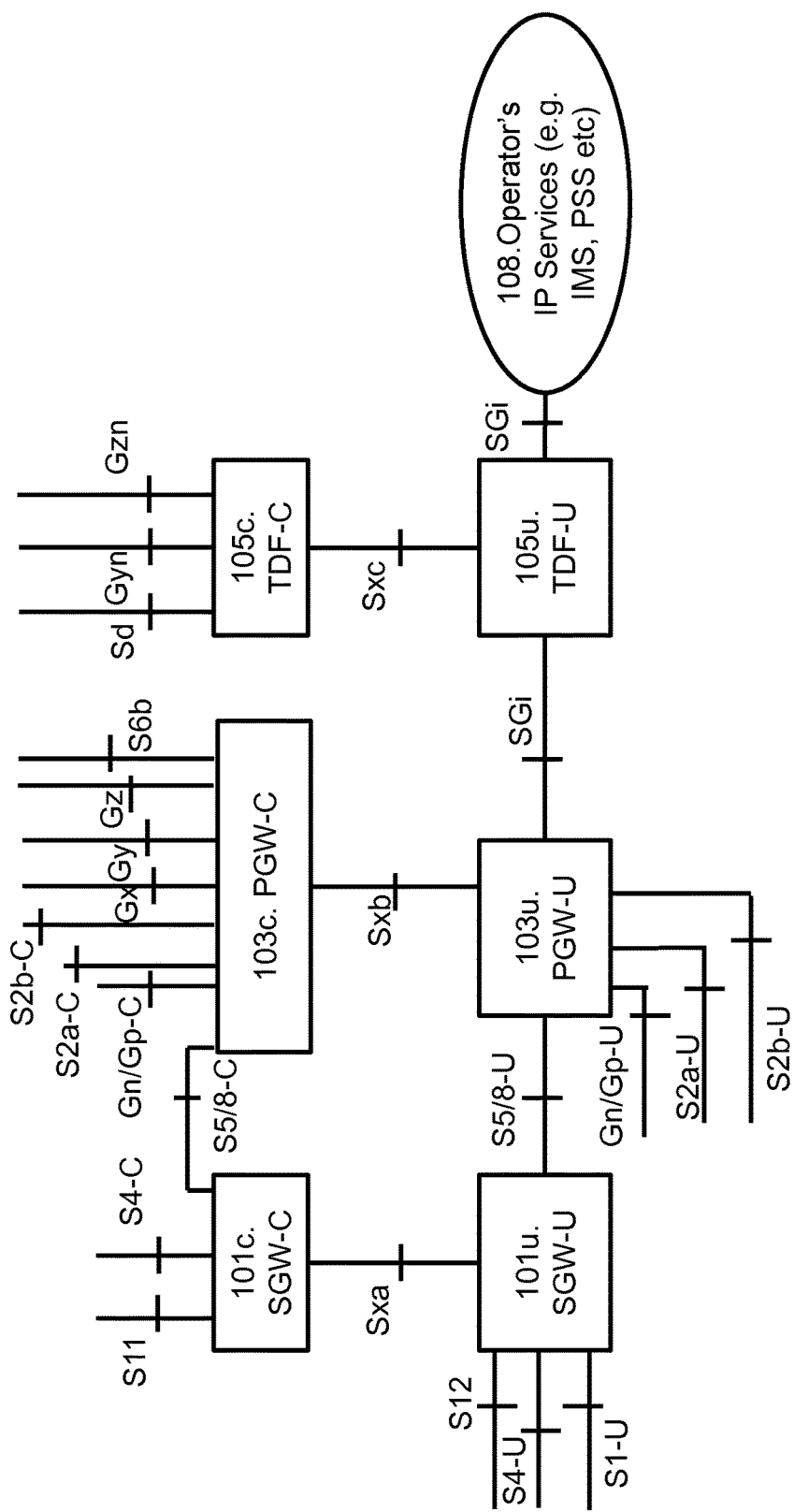
FIG. 1 is schematic block diagram illustrating a 4G network.
Figure 2:
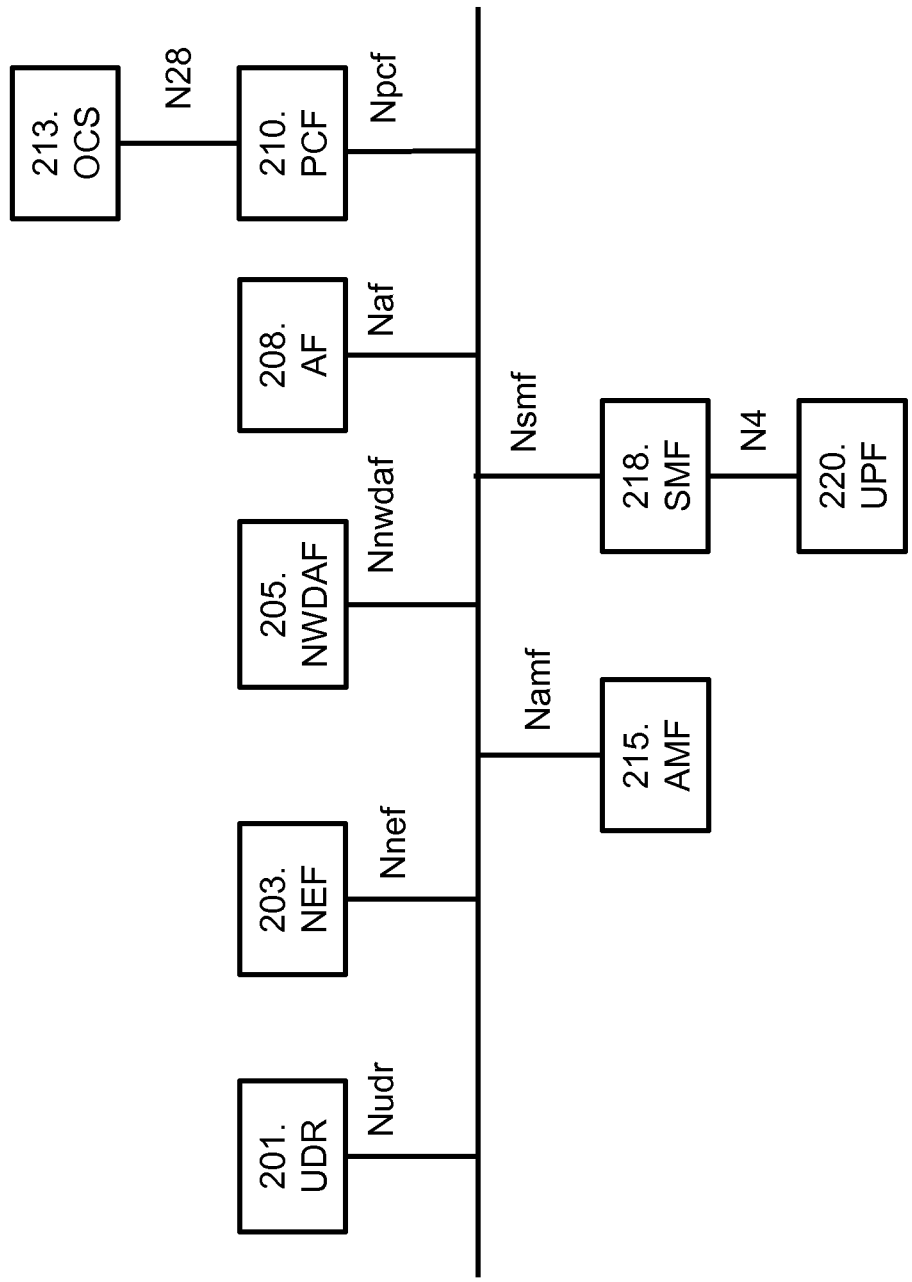
FIG. 2 is schematic block diagram illustrating a 5G network.

The communications system 300 may comprise additional entities in addition to the CPF 301 and UPF 303 illustrated in FIG. 3, such as for example at least one of the entities illustrates in FIGS. 1 and/or 2.

It should be noted that the communication links in the communications system 300 may be of any suitable kind including either a wired or wireless link. The link may use any suitable protocol depending on type and level of layer, e.g. as indicated by the Open Systems Interconnection (OSI) model, as understood by the person skilled in the art.

The method for handling pre-configured profiles for sets of detection and enforcement rules, according to some embodiments will now be described with reference to the signalling diagram in FIG. 4. The UPF 303 comprises pre-configured profiles for sets of detection and enforcement rules, and these detection and enforcement rules are applicable to any user session. This may also be described as the pre-configured profiles are bulk provisioned in the UPF 303. Thus, the UPF 303 comprises one or more pre-configured profiles, and each of the one or more pre-configured profiles comprises one set of detection and enforcement rules. The set of detection and enforcement rules may also be referred to as a plurality of detection and enforcement rules, multiple detection and enforcement rules or two or more detection and enforcement rules. Consequently, a set of detection and enforcement rules comprises a plurality of detection and enforcement rules. The method in FIG. 4 comprises at least one of the following steps, which steps may as well be carried out in another suitable order than described below:

Step 400

The UPF 303 informs the CPF 301 that it supports the pre-configuration of one or more profiles.

Step 401

The CPF 301 sends a first request for session establishment to the UPF 303. The first request comprises at least one indication for profile activation. The UPF 303 receives the first request from the CPF 301. The first request may be a first request for PFCP session establishment, or it may be any other suitable first request for session establishment. The first request may also be referred to as a session establishment request message. The indication for profile activation may also be referred to as a profile activation indication. The first request may also be referred to as a first request message.

The UPF 303 establishes the requested session, i.e. it establishes the session as indicated in the received first request.

The one or more pre-configured profiles may be common and can be applied to any user session. There may be one profile, e.g. with the most commonly used set of detection and enforcement rules. The UPF 303 may also comprise pre-configured profiles for e.g. PDRs only and individual detection and enforcement rules for FAR, QER, etc.

At least one of the detection and enforcement rules may be connected to at least one of the other detection and enforcement rules, e.g. via some identity. For example, a PDR may be connected to FAR ID, URR ID, QER ID, BAR ID.

Step 401 may be triggered by that a UE request to establish a connection to a packet data network (PDN).

Step 402

The UPF 303 activates the pre-configured profile indicated by the indication for profile activation received in the first request. The activation comprises that the UPF 303 instantiates the set of detection and enforcement rules in the pre-configured profile. The set of detection and enforcement rules may also be seen as being pre-configured since the profile is pre-configured. After having being instantiated, the set of detection and enforcement rules may be referred to as the instantiated set of detection and enforcement rules or the current set of detection and enforcement rules.

Step 403

The CPF 301 may send a second request for session modification to the UPF 303. The second request may comprise at least one modified detection and enforcement rule, or it may comprise instructions to modify at least one detection and enforcement rule identified by an identifier. The second request may be a second request for PCFP session modification, or it may be any other suitable second request for session modification. The first request may be referred to as a session modification request message.

The sending of the second request may be triggered by for instance PCC rule modifications initiated by the PCRF or changes due to online charging procedures triggered by the OCS etc.

Step 404

Step 404 is performed if step 403 is already performed. The CPF 301 may replace the instantiated detection and/or enforcement rule with the at least one modified detection and/or enforcement rule, in the pre-configured profile and for the established session, i.e. the current session. After step 404 has been performed, the pre-configured profile for the established session comprises the modified detection and enforcement rule.

The modified detection or enforcement rule may be among the ones instantiated by the pre-configured profile.

The replacing of the detection or enforcement rule instantiated by the pre-configured profile with the modified detection or enforcement rule is for the current session only. The corresponding rule in the pre-configured profile will remain unchanged when instantiated for other sessions.

Step 405

The CPF 301 may send a third request for session modification to the UPF 303. The third request may comprise at least one additional detection and/or enforcement rule. The third request may be a third request for PCFP session modification, or it may be any other suitable third request for session modification. The third request may be referred to as a session modification request message. The additional detection and/or enforcement rule may also be referred to as a new detection and/or enforcement rule.

Individual detection and/or enforcement rules may be created and combined with rules instantiated by the activated pre-configured profile in a given user session. In addition, for PDR profiles, a suitable combination may be achieved by assigning a precedence value to the profile and an offset precedence value for each rule within the profile. The additional detection and enforcement rule may be added via an O&M device.

The second and third requests in steps 403 and 405 may be separate messages, or they may be one message in which both a modified and additional detection and enforcement rule is sent to the UPF 303. Step 403 may be performed before step 405, or step 405 may be performed before step 403.

Step 406

The UPF 303 combines the instantiated detection and enforcement rule with the additional detection and enforcement rule in the set and for the established session, i.e. for the current PCFP session, i.e. the session that was requested to be established in step 401.

The additional detection and enforcement rule may be combined with the set, or with the detection and enforcement rules instantiated by the pre-configured profile.

Below is an overview of example terms used for the request messages conveyed in the example method of FIG. 4:

| First request (step 401) | First request for session establishment | Session establishment request |
|---|---|---|
| Second request (step 403) | Second request for session modification | Session modification request |
| Third request (step 405) | Third request for session modification | Session modification request |

Figure 4:
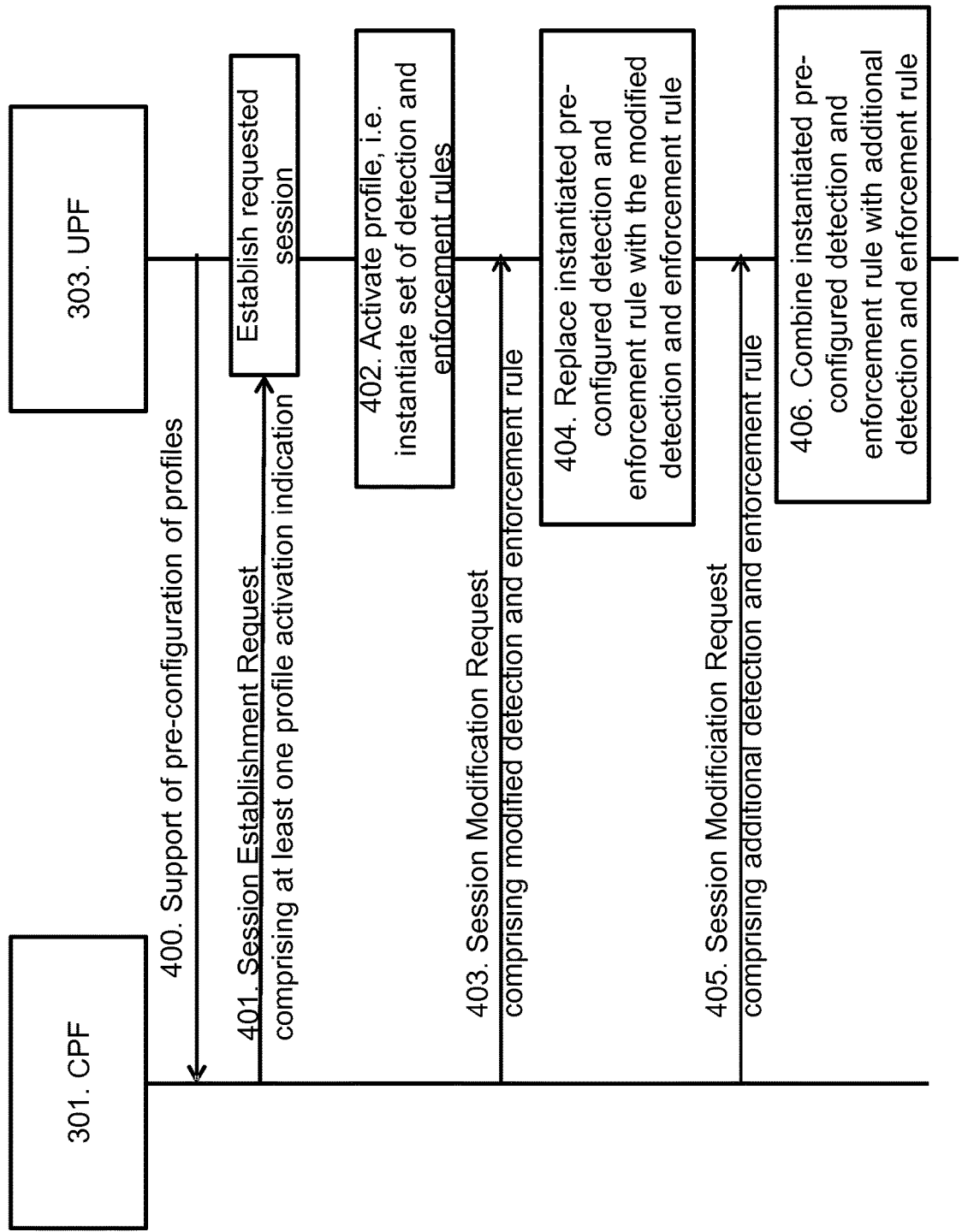
FIG. 4 is a signaling diagram illustrating an embodiment of a method.

More details of the method illustrated in FIG. 4 will now be provided.

In order for the embodiments herein to be used, the UPF 303 indicates to CPF 391 that it supports this capability (step 400 in FIG. 4) in the an association procedure, e.g. an PFCP association procedure. For that purpose, a new feature for bulk provisioning may as seen in the last row of the following Table 2:

TABLE 2

UPF features

| Feature Octet/Bit | Feature | Interface | Description |
|---|---|---|---|
| 5/1 | BUCP | Sxa, N4 | Downlink Data Buffering in CPF301 is supported by the UPF 303. |
| 5/2 | DDND | Sxa, N4 | The buffering parameter 'Downlink Data Notification Delay' is supported by the UPF 303. |
| 5/3 | DLBD | Sxa, N4 | The buffering parameter 'DL Buffering Duration' is supported by the UPF 303. |
| 5/4 | TRST | Sxb, Sxc, N4 | Traffic Steering is supported by the UPF 303. |
| 5/5 | FTUP | Sxa, Sxb, N4 | F-TEID allocation/release in the UPF 303 is supported by the UPF 303. |
| 5/6 | PFDM | Sxb, Sxc, N4 | The PFD Management procedure is supported by the UPF 303. |
| 5/7 | HEEU | Sxb, Sxc, N4 | Header Enrichment of Uplink traffic is supported by the UPF 303. |
| 5/8 | TREU | Sxb, Sxc, N4 | Traffic Redirection Enforcement in the UPF 303is supported by the UPF 303. |
| 6/1 | EMPU | Sxa, Sxb, N4 | Sending of End Marker packets supported by the UPF 303. |
| 6/2 | PDIU | Sxa, Sxb, Sxc, N4 | Support of PDI optimised signalling in UPF 303. |
| 6/3 | UDBC | Sxb, Sxc, N4 | Support of UL/DL Buffering Control |
| 6/4 | QUOAC | Sxb, Sxc, N4 | The UP function supports being provisioned with the Quota Action to apply when reaching quotas. |
| 6/5 | TRACE | Sxa, Sxb, Sxc, N4 | The UPF303 supports Trace. |
| 6/6 | FRRT | Sxb, N4 | The UPF 303supports Framed Routing . |
| 6/7 | BLKP | Sxb, Sxc, N4 | Bulk provisioning is supported by the UPF 303 |

Feature Octet/Bit: The octet and bit number within the Supported-Features IE, e.g. "5/1".
Feature: A short name that can be used to refer to the octet/bit and to the feature.
Interface: A list of applicable interfaces to the feature.
Description: A clear textual description of the feature.

The Operations and Maintenance (O&M) interface of the UPF 303 may be used to pre-configure bulk sets of PDRs, FARs, URRs, QERs and BARs, where each set can be selected by the UPF 303 through a configurable identifier. There may be one configurable identifier per set, e.g. a profile identifier.

The CPF 301 will be able to activate these sets of pre-configured PDRs, FARs, URRs, QERs and BARs by including at least one indication for profile activation in the session establishment request message in step 401 in FIG. 4, i.e. in the first request. The indication for profile activation may be in the form of an Information Element (IE) or any other suitable format. The indication for profile activation maybe for example at least one of the IEs as appended in the final eight rows of the following Table 3. The IEs in the eight final rows are the Activate PDR Profile, Activate FAR Profile, Activate URR Profile, Activate QER Profile, Activate BAR Profile, F-TEID prefix, UE IP address instance and Remote F-TEID. F-TEID is short for Fully-Qualified-Tunnel Endpoint Identifier and UE is short for User Equipment. The session establishment request message may be a PFCP session establishment request message. Note that the session establishment request message may comprise any of the other IEs in Table 3, in addition to at least one of the IEs in the final eight rows.

TABLE 3

IEs in the session establishment request message

| Information elements | P | Condition/Comment | Appl. | | | | IE Type |
|---|---|---|---|---|---|---|---|
| | | | Sxa | Sxb | Sxc | N4 | |
| Node ID | M | This IE shall contain the unique identifier of the sending Node. | X | X | X | X | Node ID |

TABLE 3-continued

IEs in the session establishment request message

| Information elements | P | Condition/Comment | Appl. Sxa | Sxb | Sxc | N4 | IE Type |
|---|---|---|---|---|---|---|---|
| CP F-SEID | M | This IE shall contain the unique identifier allocated by the CPF 301 identifying the session. | X | X | X | X | F-SEID |
| Create PDR | C | This IE shall be present for at least one PDR to be associated to the PFCP session if no Activate PDR profile is present in the message. It may be present if Activate PDR profile IE is present. Several IEs with the same IE type may be present to represent multiple PDRs. | X | X | X | X | Create PDR |
| Create FAR | C | This IE shall be present for at least one FAR to be associated to the PFCP session if no Activate FAR profile is present in the message. It may be present if Activate PDR profile IE is present. Several IEs with the same IE type may be present to represent multiple FARs. | X | X | X | X | Create FAR |
| Create URR | C | This IE shall be present if a measurement action shall be applied to packets matching one or more PDR(s) of this PFCP session if no Activate URR profile is present in the message. It maybe present if Activate PDR profile IE is present. Several IEs within the same IE type may be present to represent multiple URRs. | X | X | X | X | Create URR |
| Create QER | C | This IE shall be present if a QoS enforcement action shall be applied to packets matching one or more PDR(s) of this PFCP session if no Activate QER profile is present in the message. Several IEs within the same IE type may be present to represent multiple QERs. | — | X | X | X | Create QER |
| Create BAR | O | When present, this IE shall contain the buffering instructions to be applied by the UPF 303 to any FAR of this PFCP session set with the Apply Action requesting the packets to be buffered and with a BAR ID IE referring to this BAR. | X | — | — | X | Create BAR |
| Create Traffic Endpoint | C | This IE may be present if the UP function has indicated support of PDI optimization. Several IEs within the same IE type may be present to represent multiple Traffic Endpoints. | X | X | X | X | Create Traffic Endpoint |
| PDN Type | C | This IE shall be present if the PFCP session is setup for an individual PDN connection or PDU session. When present, this IE shall indicate whethert his is an IP or non-IP PDN connection/PDU session or, for 5GC, an Ethernet PDU session. | X | X | — | X | PDN Type |
| SGW-C FQ-CSID | C | This IE shall be included according to the requirements in clause 23 of 3GPP TS 23.007. | X | X | — | — | FQ-CSID |
| MME FQ-CSID | C | This IE shall be included when received on the S11 interface or on S5/S8 interface according to the requirements in clause 23 of 3GPP TS 23.007. | X | X | — | — | FQ-CSID |
| PGW-C FQ-CSID | C | This IE shall be included according to the requirements in clause 23 of 3GPP TS 23.007. | X | X | — | — | FQ-CSID |
| ePDG FQ-CSID | C | This IE shall be included according to the requirements in clause 23 of 3GPP TS 23.007. | — | X | — | — | FQ-CSID |
| TWAN FQ-CSID | C | This IE shall be included according to the requirements in clause 23 of 3GPP TS 23.007. | — | X | — | — | FQ-CSID |

TABLE 3-continued

IEs in the session establishment request message

| Information elements | P | Condition/Comment | Appl. Sxa | Sxb | Sxc | N4 | IE Type |
|---|---|---|---|---|---|---|---|
| User Plane Inactivity Timer | O | This IE may be present to request the UP function to send a User Plane Inactivity Report when no user plane packets are received for this PFCP session for a duration exceeding the User Plane Inactivity Timer. When present, it shall contain the duration of the inactivity period after which a User Plane Inactivity Report shall be generated. | — | X | X | X | User Plane Inactivity Timer |
| Activate PDR Profile | O | This IE may be present to provision PDRs preconfigured in UPF 303 as identified by thePDR Profile ID Several IEs with the same IE type may be present to represent multiple PDR profiles | X | X | X | X | Activate PDR Profile |
| Activate FAR Profile | O | This IE may be present to provision FARs preconfigured in UPF as identified by the FAR Profile ID Several IEs with the same IE type may be present to represent multiple FAR profiles | X | X | X | X | Activate FAR Profile |
| Activate URR Profile | O | This IE may be present to provision URRs preconfigured in UPF as identified by the URR Profile ID Several IEs with the same IE type may be present to represent multiple URR profiles | X | X | X | X | Activate URR Profile |
| Activate QER Profile | O | This IE may be present to provision QERs preconfigured in UPF as identified by the QER Profile ID Several IEs with the same IE type may be present to represent multiple QER profiles | — | X | X | X | Activate QER Profile |
| Activate BAR Profile | | This IE may be present to provision BARs preconfigured in UPF 303 as identified by the BAR Profile ID Several IEs with the same IE type may be present to represent multiple BAR profiles | X | — | — | X | Activate BAR Profile |
| F-TEID prefix | C | This IE shall be present if Activate PDR Profile IE is present | X | X | X | X | F-TEID prefix |
| UE IP address instance | C | This IE shall be present if Activate PDR Profile IE is present Several IEs with the same IE type may be present to represent multiple UE IP Addresses | X | X | X | X | UE IP address instance |
| Remote F-TEID | C | This IE shall be present if Activate FAR Profile IE is present. Remote F-TE ID Several IEs with the same IE type may be present to represent multiple Remote F-TEIDs | X | X | X | X | Remote F-TEID |

The profile activation indicators may be as follows:

TABLE 4

Activate PDR Profile IE within the session establishment request

| Octet 1 and 2 | | Activate PDR Profile IE Type = 140 (decimal) | | | | | |
|---|---|---|---|---|---|---|---|
| Octets 3 and 4 | | Length = n | | | | | |
| Information elements | P | Condition/Comment | Appl. Sxa | Sxb | Sxc | N4 | IE Type |
| Profile ID | M | This IE shall uniquely identify the PDR Profile among all the PDR Profiles configured at the UPF 303. | X | X | X | X | Profile ID |
| Precedence | M | This IE shall indicate the precedence of the first PDR in the PDR profile. The precedence of subsequent PDRs in the profile for this session shall be computed by adding the relative precedence in the PDR profile to the precedence of the first PDR specified by this IE. | X | X | X | X | Precedence |

TABLE 5

Activate FAR Profile IE within the session establishment request

| Octet 1 and 2 | | Activate FAR Profile IE Type = 141 (decimal) | | | | | |
| --- | --- | --- | --- | --- | --- | --- | --- |
| Octets 3 and 4 | | Length = n | | | | | |
| Information | | | Appl. | | | | |
| elements | P | Condition/Comment | Sxa | Sxb | Sxc | N4 | IE Type |
| Profile ID | M | This IE shall uniquely identify the FAR Profile among all the FAR Profiles configured at the UPF 303. | X | X | X | X | Profile ID |

TABLE 6

Activate URR Profile IE within the session establishment request

| Octet 1 and 2 | | Activate URR Profile IE Type = 142 (decimal) | | | | | |
| --- | --- | --- | --- | --- | --- | --- | --- |
| Octets 3 and 4 | | Length = n | | | | | |
| Information | | | Appl. | | | | |
| elements | P | Condition/Comment | Sxa | Sxb | Sxc | N4 | IE Type |
| Profile ID | M | This IE shall uniquely identify the URR Profile among all the URR Profiles configured at the UPF 303. | X | X | X | X | Profile ID |

TABLE 7

Activate QER Profile IE within the session establishment request

| Octet 1 and 2 | | Activate QER Profile IE Type = 143 (decimal) | | | | | |
| --- | --- | --- | --- | --- | --- | --- | --- |
| Octets 3 and 4 | | Length = n | | | | | |
| Information | | | Appl. | | | | |
| elements | P | Condition/Comment | Sxa | Sxb | Sxc | N4 | IE Type |
| Profile ID | M | This IE shall uniquely identify the QER Profile among all the QER Profiles configured at the UPF 303. | — | X | X | X | Profile ID |

TABLE 8

Activate BAR Profile IE within the session establishment request

| Octet 1 and 2 | | Activate BAR Profile IE Type = 144 (decimal) | | | | | |
| --- | --- | --- | --- | --- | --- | --- | --- |
| Octets 3 and 4 | | Length = n | | | | | |
| Information | | | Appl. | | | | |
| elements | P | Condition/Comment | Sxa | Sxb | Sxc | N4 | IE Type |
| Profile ID | M | This IE shall uniquely identify the BAR Profile among all the BAR Profiles configured at the UP 303. | X | — | — | X | Profile ID |

TABLE 9

UE IP address instance IE within the session establishment request

| Octet 1 and 2 | | UE IP address IE Type = 140 (decimal) | | | | | |
|---|---|---|---|---|---|---|---|
| Octets 3 and 4 | | Length = n | | | | | |

| Information elements | P | Condition Comment | Appl. Sxa | Sxb | Sxc | N4 | IE Type |
|---|---|---|---|---|---|---|---|
| UE IP address instance ID | M | This IE shall uniquely identify the UE IP Address instance ID to be replaced by the address associated UE IP address value in instance ID preconfigured PDRs. Its value will be unique within a PFCP Session Establishment Request. | X | X | X | X | UE IP |
| UE IP address | M | This IE shall indicate the UE IP address for the associated instance ID. It will be applied to the predefined PDRs including the UE IP address instance ID. | X | X | X | X | UE IP address |

TABLE 10

Remote F-TEID IE within the session establishment request

| Octet 1 and 2 | | Remote F-TEID index IE Type = 140 (decimal) | | | | | |
|---|---|---|---|---|---|---|---|
| Octets 3 and 4 | | Length = n | | | | | |

| Information elements | P | Condition/Comment | Appl. Sxa | Sxb | Sxc | N4 | IE Type |
|---|---|---|---|---|---|---|---|
| Remote F-TEID index | M | This IE shall uniquely identify the Remote F-TEID index to be replaced by the associated F-TEID value in preconfigured FARs for Outer Header Creation. Its value will be unique within a PFCP Session Establishment Request. | X | X | X | X | Remote F-TEID index |
| F-TEID | M | This IE incudes the F-TEID value to replace the Remote F-TEID index in preconfigured FARs for Outer Header Creation. | X | X | X | X | F-TEID |

The F-TEID Prefix IE type may be encoded as shown in Table 11

TABLE 11

F-TEID Prefix

| Octets | 8 | 7 | 6 | 5 | 4 | 3 | 2 | 1 |
|---|---|---|---|---|---|---|---|---|
| 1 to 2 | | | | Type = 145 (decimal) | | | | |
| 3 to 4 | | | | Length = n | | | | |
| 5 | | | Prefix length (bits) | | | CH | V6 | V4 |
| 6 to 9 | | | | TEID Prefix | | | | |
| m to (m + 3) | | | | IPv4 address | | | | |
| p to (p + 15) | | | | IPv6 address | | | | |
| k to (n + 4) | | | These octet(s) is/are present only if explicitly specified | | | | | |

F-TEID prefix is used for transmitting the TEID prefix and IP address of the transmitting entity, i.e. the F-TEID comprises the TEID prefix and IP address of the transmitting entity. The CPF 301 sends the TEID prefix, and the UPF 303 then adds the offset to the TEID prefix to obtain the F-TEID. The F-TEID is the TEID prefix plus the IP address. The transmitting entity may be the CPF 301. The F-TEID prefix may be used in at least one of the following ways:

1) The CPF 301 may allocate the F-TEID prefix and includes the F-TEID prefix as such in the parameter. The F-TEID value is composed by the UPF 303 using the provided F-TEID prefix and the pre-configured offset.
2) The CPF 301 may request the UPF 303 to allocate the F-TEID prefix instead. For that purpose, the CAF 301 may includes a CHOOSE flag in the F-TEID prefix. Then the UPF 303 composes the F-TEID value using the chosen F-TEID prefix indicated by the CHOOSE flag In addition, the pre-configured profile may comprise one or more UE IP addresses, as seen in Table 10. Each of UE IP address may be identified by an index which is used to replace the corresponding parameter in the pre-configured PDR with the corresponding UE IP address value in the instantiated PDR.

The same indications for profile activation may apply for session modification, plus the corresponding Deactivate PDR profile, Deactivate FAR profile, Deactivate URR profile, Deactivate QER profile and Deactivate BAR profile.

Note that there is no indication for update profile activation for the pre-configured FAR, URR, QER and BAR profiles. All updating of the full pre-configured profiles may be done through the O&M, although updating of individual elements can be done in the same way as in the current technology. However, an Update PDR Profile is included to allow modification of the precedence. The Modify UE IP Address and Modify Remote F-TEID IEs are also included for the session modification.

At least some or preferably all pre-configured PDR profiles may be assigned a profile precedence, so that the packet detection matching of PDRs instantiated by that pre-configured profile may be performed before or after the PDRs instantiated by other pre-configured profiles, according to their profile precedence. The precedence may be applicable among different pre-configured PDR profiles and among individual PDRs and the PDRs in those pre-configured profiles. All PDRs within a given pre-configured PDR profile may each also be assigned an instantiated rule precedence and this rule precedence may be calculated based on the precedence offset and the profile precedence of the pre-configured PDR profile, where "base on" may refer to adding, subtracting or any other suitable operation. It may be possible to configure non-contiguous precedence values to the PDRs in a pre-configured profile. This may allow individual PDRs installed at session establishment or modification to be interleaved with the ones for predefined PDRs to specify the matching order for traffic classification.

All PDRs in a PFCP session may be assigned a rule precedence. When the CPF 301 activates a pre-configured PDR profile, it does not want to provide rule precedencies for each and every individual PDR in the instantiated pre-configured profile. For that purpose, the CPF 301 assigns a profile precedence to the pre-configured profile itself and sends together with the indication for profile activation. The UPF 303 holds a rule precedence offset for each of the PDRs in the pre-configured profile and determines an instantiated rule precedence based on the profile precedence and the rule precedence offset, for example a sum of the profile precedence and the rule precedence offset. This instantiated rule precedence is the precedence of the instantiated PDR. E.g. a profile precedence=100 and a rule precedence offset=12 results in an instantiated rule precedence=112

Below is an overview of the different precedencies:
Profile precedence: Precedence assigned by the CPF 301 to a pre-configured profile. The profile precedence may also be referred to as a precedence of the profile or a first precedence.
Rule precedence: Precedence assigned by the CPF 301 to a detection and enforcement rule. The rule precedence may also be referred to as a precedence of a rule, a PDR precedence, a precedence of a PDR or a second precedence.
Rule precedence offset: For each pre-configured detection and enforcement rule. Held by the UPF 303. The rule precedence offset may also be referred to as a precedence offset of a rule, a precedence offset of a PDR, a PDR precedence offset or a third precedence.
Instantiated rule precedence=profile precedence+rule precedence offset. The instantiated rule precedence may also be referred to as a precedence of an instantiated rule, an instantiated PDR precedence, a precedence of the instantiated PDR or a fourth precedence A precedence may be of a certain value, and the precedence may therefore also be referred to as a precedence value. However, the term precedence will be used herein when referring to a precedence value, for the sake of simplicity. The precedence may also be referred to as a priority. A rule with a high precedence compared to another rule will be prioritized compared to the other rule with lower precedence.

Individual PDRs, FARs, URRs, QERs and BARs can be included together with one or more Activate Profile IEs in a PFCP session establishment request message in step 401 in FIG. 4.

In existing PDRs and FARs, there are some dynamic parameters that are specific for the session and therefore cannot be provisioned at configuration time, i.e. they cannot be pre-configured. The affected parameters are:
F-TEID
Remote F-TEID, used for Outer Header Creation in FARs
UE IP address In order to provision PDRs with the UE IP Address, PDR templates can be pre-configured in the pre-configured PDR profiles in the UPF 303, where it is specified that a UE IP address must be matched, but the matching value shall be provisioned at session establishment by indicating a UE IP address instance ID. For that purpose, an indication for profile activation for the UE IP address has been appended to Table 3, see the second last row in the table.

To provision F-TEID values, an F-TEID prefix IE has been added to the PFCP session establishment request and an F-TEID offset shall be configured for each PDR for which the F-TEID value needs to be matched. When the F-TEID is selected by the CPF 301, the F-TEID prefix shall be sent to the UPF 303 at session establishment or modification, as specified by Table 3 and Table 11. This will be combined with the F-TEID offset configured for each PDR in the pre-configured PDR profile to build the actual F-TEID value at session establishment or modification.

Since the CPF 301 also needs to know the F-TEID assigned to each PDR and to avoid the UPF 303 having to respond to the CPF 301 with a large list of assigned F-TEIDs, the CPF 301 may have a copy of the F-TEID offsets per pre-configured PDR. This way, it may compose the F-TEID values for the session by combining the offsets with the F-TEID prefix.

When the F-TEID is selected by the UPF 303, the F-TEID prefix IE shall contain a CHOOSE flag set instead of the F-TEID prefix. In this case, the UPF 303 may select its own F-TEID prefix and will use the F-TEID offset of the pre-configured PDRs in the pre-configured profile to compose the actual F-TEID values per PDR. The chosen F-TEID Prefix may be returned to the CPF 301 in the session establishment or modification response, so that it may derive the F-TEID values assigned for the session by combining it with its stored list of F-TEID offsets per configured PDR in each pre-configured PDR profile.

The resulting PDRs may function as a working copy of the selected pre-configured PDR profile, applicable to the current session only. As an option, only the variable part of the PDRs may be stored separately from the common pre-configured PDR profile by the UPF 303. In order to be able to customize and modify preconfigured FARs, URRs, QERs and BARs, they may also be instantiated as a working copy applicable to the current session. A working copy may be described as a short-term or transitory copy of the pre-configured profile, utilized as related or reference-only information. The CPF 301 may modify the instantiated detection and enforcement rules by sending new values for the different fields of these IEs together with the FAR Id, URR Id, QER Id or BAR Id in the pre-configured profile.

Since several PDRs may be connected to the same FAR Id, URR Id, QER Id and/or BAR Id, this may be used to update the forwarding, reporting, QoS and buffering settings for many preconfigured PDRs at the same time.

It is also possible to modify a single pre-configured PDR by modifying the existing FAR Id, URR Id, QER Id and BAR Id and pointing to either new FAR, URRs, QERs and BARs to be installed or to other pre-configured FARs, URRs, QERs or BARs.

The embodiments herein may be described by the following steps a)-d), with some included examples:

Step a)

The UPF 303 is provisioned with several pre-configured profiles for PDRs, FARs, URRs, QERs and BARs by an O&M entity, where:

- Each pre-configured profile has a profile identity that can later be selected by the CPF
- Each pre-configured profile has one or more instances of PDRs, FARs, URRs, QERs or BARs, depending on the type of pre-configured profile, e.g. FAR profiles include a set of FARs.
- Each element in the pre-configured profile has an Identifier that can be later be addressed by the CPF 301, e.g. PDRs have a PDR Id.
- The PDRs in a pre-configured PDR profile may have a relative precedence number, which may be consecutive or separate from the previous one. Different PDRs in a pre-configured profile have different precedence values, but PDRs in different pre-configured profiles may have the same precedence value.
- The preconfigured PDRs are connected to FAR Ids, URR Ids, QER Ids and/or BAR Ids in pre-configured profiles.
- PDR Ids, FAR Ids, URR Ids, QER Ids and BAR Ids are unique across all pre-configured profiles.
- F-TEID offset is included, usually for uplink PDRs, and UE IP address may be included with no value, usually for downlink PDRs, where the actual UE IP address is received at session establishment or modification and the F-TEID values are computed by UPF 303 by combining the F-TEID prefix received at session establishment or modification with the stored F-TEID offset per PDR.

The O&M entity mentioned above is a network element in the operator's network. The O&M entity is adapted to be connected to the different nodes, e.g. the CPF 301 and/or the UPF 303, to manage them, including provisioning, configuration, alarm handling etc.

Table 12 below is an example of a possible configuration of a pre-configured PDR profile:

TABLE 12

| Pre-configured PDR profile |
|---|
| PDR Profile ID = "Social Network PDRs" |
| PDR Id = 1 |
| Precedence-Offset = 0 |
| Source Interface = Access |
| F-TEID offset = 1 |
| Application Id = "Facebook" |
| FAR Id = 1 |
| URR Id = 1 |
| QER Id = 1 |
| PDR Id = 2 |
| Relative-Precedence = 1 |
| Source Interface = Core |
| UE IP Address instance ID = 1 |
| Application Id = "Facebook" |
| FAR Id = 2 |
| URR Id = 1 |
| QER Id = 1 |
| PDR Id = 3 |
| Precedence-Offset = 10 |
| Source Interface = Access |
| F-TEID offset = 2 |
| Application Id = "Instagram" |
| FAR Id = 1 |
| URR Id = 2 |
| QER Id = 2 |

TABLE 12-continued

| Pre-configured PDR profile |
|---|
| PDR Id = 4 |
| Precedence-Offset = 11 |
| Source Interface = Core |
| UE IP Address instance ID = 1 |
| Application Id = "Instagram" |
| FAR Id = 2 |
| URR Id = 2 |
| QER Id = 2 |

Table 13 below is an example of a possible configuration of a pre-configured FAR profile:

TABLE 13

| Pre-configured FAR profile |
|---|
| FAR Profile ID = "Basic FARs" |
| FAR Id = 1 |
| Apply Action = Forward |
| Forwarding Parameters: |
| Destination Interface = Core |
| FAR Id = 2 |
| Apply Action = Forward |
| Forwarding Parameters: |
| Destination Interface = Access |
| Outer Header Creation: |
| Remote F-TEID ID = 2 |

Table 14 below is an example of a possible configuration of a pre-configured FAR profile:

TABLE 14

| Pre-configured URR profile |
|---|
| URR Profile ID = "Basic URRs" |
| URR Id = 1 |
| Measurement Method = Volume |
| Reporting Triggers = Periodic Reporting |
| Measurement Period = 1 minute |
| URR Id = 2 |
| Measurement Method = Time |
| Reporting Triggers = Threshold |
| Time Threshold = 1 hour |

Table 15 below is an example of a possible configuration of a pre-configured QER profile:

TABLE 15

| Pre-configured QER profile |
|---|
| QER Profile ID = "Basic QERs" |
| QER Id = 1 |
| MBR = 128 kbps |
| QER Id = 2 |
| MBR = 256 kbps |

Step b)

This step corresponds to step 401 in FIG. 4. At session establishment, the CPF 301 sends a session establishment request to the UPF 300, including one or more indications for profile activation. The profile activation indicator may be at least one of the following information elements: "Activate PDR profile", "Activate FAR profile", "Activate URR profile", "Activate QER profile" and/or "Activate BAR profile".

When an "Activate PDR Profile" IE is included, the F-TEID prefix and UE IP address instance may also be provided. When an "Activate FAR Profile" IE is included, at least one Remote F-TEID value may be provided.

Pre-configured FAR, URR, QER and BAR profiles may be provided so that all FAR Ids, URR Ids, QER Ids and BAR Ids referenced by the pre-configured PDRs in the activated pre-configured PDR profiles are defined. If this is not fulfilled, UPF 303 may respond with an error indication and the session establishment will fail.

As an alternative, some of the referenced FAR Ids, URR Ids, QER Ids and BAR Ids may be installed directly by including individual Create FAR, Create URR, Create QER and Create BAR information elements in the session establishment or modification request message.

Table 16 below is an example of the session establishment request message with profile activation indicators:

TABLE 16

| PFCP Session Establishment Request | |
|---|---|
| Node ID | SMF-005 |
| CP F-SEID | 25350; 216.3.128.12 |
| Activate PDR Profile | Profile ID = "Social Network PDRs" |
| | Precedence = 100 |
| Activate FAR Profile | Profile ID = "Basic FARs" |
| Activate URR Profile | Profile ID = "Basic URRs" |
| Activate QER Profile | Profile ID = "Basic QERs" |
| F-TEID Prefix | Prefix Length = 4 |
| | F-TEID Prefix = 4096 |
| | IPv4 address = 216.2.128.20 |
| UE IP address instance | 1; 216.4.128.16 |
| Remote F-TEID | 1: 5073; 216.2.128.25 |
| Remote F-TEID | 2: 5074; 216.2.128.25 |

Step c)

This step corresponds to step 402 in FIG. 4. When the UPF 303 receives such a message, it may instantiate at least one of the examples of PDRs in Table 17 for the session:

TABLE 17

| PDR |
|---|
| PDR Id = 1 |
| Precedence = 100 |
| Source Interface = Access |
| F-TEID = 4097; 216.2.128.20 |
| Application Id = "Facebook" |
| FAR Id = 1 |
| URR Id = 1 |
| PDR Id = 2 |
| Precedence = 101 |
| Source Interface = Core |
| UE IP Address = 216.4.128.16 |
| Application Id = "Facebook" |
| FAR Id = 2 |
| URR Id = 1 |
| QER Id = 1 |
| PDR Id = 3 |
| Precedence = 110 |
| Source Interface = Access |
| F-TEID = 4098; 216.2.128.20 |
| Application Id = "Instagram" |
| FAR Id = 1 |
| URR Id = 2 |
| QER Id = 2 |
| PDR Id = 4 |
| Precedence = 111 |
| Source Interface = Core |
| UE IP Address = 216.4.128.16 |
| Application Id = "Instagram" |
| FAR Id = 2 |
| URR Id = 2 |
| QER Id = 2 |

The FARs may be instantiated according to the provided value of F-TEID, as exemplified in Table 18:

TABLE 18

| Pre-configured FAR profile |
|---|
| FAR Profile ID = "Basic FARs" |
| FAR Id = 1 |
| Apply Action = Forward |
| Forwarding Parameters: |
| Destination Interface = Core |
| FAR Id = 2 |
| Apply Action = Forward |
| Forwarding Parameters: |
| Destination Interface = Access |
| Outer Header Creation: |
| F-TEID = 5074; 216.2.128.25 |

Step d)

This step corresponds to steps 403-406 in FIG. 4. At session modification, the CPF 301 may change the instantiated PDRs, FARs, URRs and QERs by using their IDs, as for any other installed IEs. Modification may comprise creation of a new rule and/or updating of an existing rule. It may also connect PDRs with new FARs, URRs, etc. as illustrated by the following example of session modification request message seen in Table 19:

TABLE 19

| Session modification request | |
|---|---|
| Node ID | SMF-005 |
| CP F-SEID | 25350; 216.3.128.12 |
| Create FAR | FAR ID = 100 |
| | Apply Action = forward |
| | Forwarding Parameters: |
| | Destination Interface = Access |
| | Redirect Information = "topup.operator.com" |
| | Outer Header Creation = 2570; |
| | 216.2.128.25 |
| Update PDR | PDR ID = 1 |
| | FAR ID = 100 |
| | URR ID = 1 |

The method described above will now be described seen from the perspective of the UPF 303. FIG. 5 is a flowchart describing the present method in the UPF 303 for handling pre-configured profiles for sets of detection and enforcement rules. The UPF 303 comprises one or more pre-configured profiles applicable to any user session. Each pre-configured profile comprises a set of detection and enforcement rules. Each pre-configured profile comprises a profile ID for identifying the pre-configured profile and the set of detection or enforcement rules for the pre-configured profile. The method comprises at least one of the following steps to be performed by the UPF 303, which steps may be performed in any suitable order than described below:

Step 500

This step corresponds to step 400 in FIG. 4. The UPF 303 may send, to the CPF (301), information indicating that the user plane function supports pre-configuration of the one or more profiles for sets of detection and enforcement rules.

The pre-configured detection and enforcement rules may be at least one of a PDR, FAR, QER, URR and BAR.

Step 501

This step corresponds to step 401 in FIG. 4. The UPF 303 receives, from a CPF 301, a first request for session establishment comprising at least one indication for profile activation for each pre-configured profile to be activated. The at least one indication profile activation comprises the profile ID of the pre-configured profile to be activated.

The pre-configured profiles are common and can be applied to any user session.

Step 502

This step corresponds to step 401 in FIG. 4. The UPF 303 establishes the session indicated in the first request.

Step 503

This step corresponds to step 402 in FIG. 4. For the established session, the UPF 303 activates the at least one pre-configured profile identified by the profile ID by instantiating the set of detection and enforcement rules for the pre-configured profile.

Step 504

This step corresponds to step 403 in FIG. 4. The UPF 303 may receive, from the CPF (301), a second request for session modification comprising at least one modified detection and enforcement rule.

Step 505

This step corresponds to step 404 in FIG. 4. The UPF 303 may replace at least one of the pre-configured detection and enforcement rules in the instantiated set with the at least one modified detection and enforcement rule for the established session. This step may also be described as modifying by replacing at least one of the pre-configured detection and enforcement rules in the instantiated set with the at least one modified detection and enforcement rule for the established session.

Step 506

This step corresponds to step 405 in FIG. 4. The UPF 303 may receive, from the CPF 301, a third request for session modification comprising at least one additional detection and enforcement rule.

Step 507

This step corresponds to step 406 in FIG. 4. The UPF may combine the at least one additional detection and enforcement rule with at least one of the detection and enforcement rules of the instantiated set of detection and enforcement rules and for the established session. This step may also be described as modifying by combining the at least one additional detection and enforcement rule with at least one of the detection and enforcement rules of the instantiated set of detection and enforcement rules.

Step 508

The pre-configured profile may be a pre-configured PDR profile for a set of detection and enforcement rules being PDRs. Each pre-configured PDR profile may be associated with a profile precedence. The UPF 303 may comprise a rule precedence offset associated with each PDR in the set of detection and enforcement rules of the pre-configured PDR profile. The UPF 303 may determine an instantiated precedence based on the profile precedence to the rule precedence offset. The UPF 303 may determine to apply the pre-configured profile according to the instantiated precedence.

When the one or more pre-configured profiles is for a set of detection and enforcement rules being PDRs, then the indication for profile activation may comprise a F-TEID prefix and one or more UE IP address for the established session. The F-TEID prefix and the UE IP address may be matched by the UPF 303 with corresponding parameters in at least one of the PDRs in the in the pre-configured profile. The F-TEID prefix and the UE IP address may be replaced by the UPF 303 by the corresponding parameters in the PDRs when they are instantiated. The F-TEID prefix and the one or more UE IP addresses may be included as placeholders to be matched by the rules in the pre-configured profile. At session establishment, the placeholders may be be replaced by these values when the rule is instantiated.

When the one or more pre-configured profiles is for a set of detection and enforcement rules being FARs, then the indication for profile activation may comprise at least one remote F-TEID and an associated remote F-TEID index. The at least one remote F-TEID index may be matched by the UPF 303 with the FARs in the pre-configured profile. A parameter identified by the remote F-TEID index may be replaced by the UPF 303 by a remote F-TEID value and is included in the instantiated FAR. The at least one remote F-TEID value may be replaced by the UPF 303 by a corresponding parameter with the same remote F-TEID index in the received first request and included in the instantiated FAR. The indication may comprise one, to or multiple remote F-TEIDs. The remote F-TEIDs may be comprised in the indication as placeholders to be matched by the rules in the pre-configured profile. At session establishment, the placeholders identified by their index may be replaced by the corresponding values with the same index received in this message and included in the instantiated rule.

Each remote F-TEID may have an associated index, e.g. the remote F-TEID index, so there are two parameters: the value and the index that allows matching the applicable parameter in the profile.

The method described above will now be described seen from the perspective of the CPF 301. FIG. 6 is a flowchart describing the present method in the CPF 301 for handling pre-configured profiles for sets of detection and enforcement rules. The method comprises at least one of the following steps to be performed by the CPF 301, which steps may be performed in any suitable order than described below:

Step 600

This step corresponds to step 400 in FIG. 4. The CPF 301 may receive, from the UPF 303, information indicating that the user plane function supports pre-configuration of the pre-configured profiles for the sets of detection and enforcement rules.

Step 601

This step corresponds to step 401 in FIG. 4. The CPF 301 transmits, to a UPF 303, a first request for session establishment comprising at least one indication for profile activation for at least one pre-configured profile to be activated. The indication for profile activation comprises a profile ID of the pre-configured profile to be activated. The at least one pre-configured profile comprises a set of detection and enforcement rules. The detection and enforcement rules in the set may be at least one of a PDR, FAR, QER, URR and BAR.

Step 602

This step corresponds to step 403 in FIG. 4. The CPF 301 may transmit, to the UPF 303, a second request for session modification comprising at least one modified detection and enforcement rule among the detection and enforcement rules in the set. The modified detection and enforcement rule should replace a corresponding detection and enforcement rule in an instantiated set.

Step 603

This step corresponds to step 405 in FIG. 4. The CPF 301 may transmit, to the UPF 303, a third request for session modification comprising at least one new detection and enforcement rule to be combined with at least one detection and enforcement rule in an instantiated set.

The pre-configured profile may be a pre-configured PDR profile for a set of detection and enforcement rules being PDRs. The pre-configured PDR profile may be associated with a profile precedence value, and each PDR in the set may be associated with an offset rule precedence value. A precedence value in an instantiated PDR may be based on the profile precedence value and the offset rule precedence value.

When the one or more pre-configured profile is for a set of detection and enforcement rules being PDRs, then the indication for profile activation may comprise a F-TEID prefix and one or more UE IP address for the established session.

When the one or more pre-configured profile is for a set of detection and enforcement rules being FARs, then the indication for profile activation may comprise a remote F-TEID and an associated remote F-TEID index.

Figure 7:
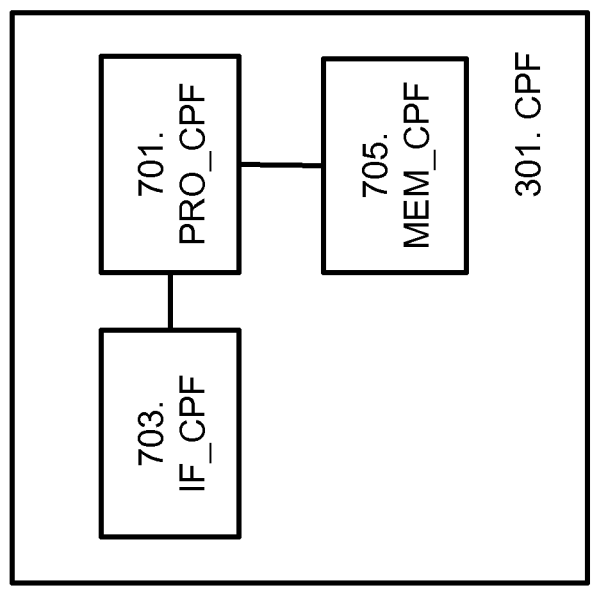
FIG. 7 is a schematic block diagram illustrating an embodiment of a UPF.

In FIG. 7, there is shown a CPF apparatus. The CPF 301 comprises a processor PRO_CPF 701, an interface IF_CPF 703 and a memory MEM_CPF 705, in which memory instructions are stored for carrying out the method steps explained above. The CPF 301 communicates via the interface IF_CPF 703. The IF_CPF 703 comprises both an external interface, communicating with a transmitter and receiver, and internal interfaces (not shown).

The CPF 301 is adapted to, e.g. by means of the IF_CPF 703, transmit, to a UPF 303, a first request for session establishment comprising at least one indication for profile activation for at least one pre-configured profile to be activated. The indication for profile activation comprises a profile ID of the pre-configured profile to be activated.

The CPF 301 is further adapted to, e.g. by means of the IF_CPF 703, transmit, to the UPF 303, a second request for session modification comprising at least one modified detection and enforcement rule among the detection and enforcement rules in the set. The modified detection and enforcement rule should replace a corresponding detection and enforcement rule in an instantiated set.

The CPF 301 is further adapted to, e.g. by means of the IF_CPF 703, transmit, to the UPF 303, a third request for session modification comprising at least one new detection and enforcement rule to be combined with at least one detection and enforcement rule in an instantiated set.

The pre-configured profile may be a pre-configured PDR profile for a set of detection and enforcement rules being PDRs. The pre-configured PDR profile may be associated with a profile precedence value, and each PDR in the set may be associated with an offset rule precedence value. A precedence value in an instantiated PDR may be based on the profile precedence value and the offset rule precedence value.

The CPF 301 is further adapted to, e.g. by means of the IF_CPF 703, receive, from the UPF 303, information indicating that the user plane function supports pre-configuration of the pre-configured profiles for the sets of detection and enforcement rules.

When the one or more pre-configured profile is for a set of detection and enforcement rules being PDRs, then the indication for profile activation may comprise a F-TEID prefix and one or more UE IP address for the established session.

When the one or more pre-configured profile is for a set of detection and enforcement rules being FARs, then the indication for profile activation may comprise a remote F-TEID and an associated remote F-TEID index.

The detection and enforcement rules in the set may be at least one of PDR, FAR, QER, URR and BAR.

Figure 8:
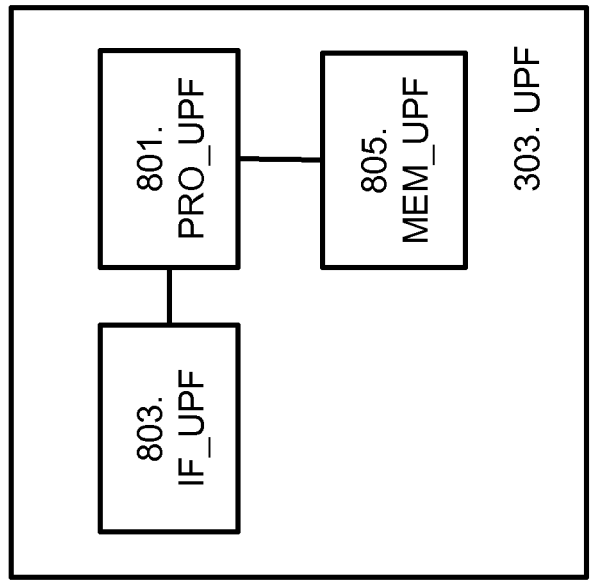
FIG. 8 is a schematic block diagram illustrating an embodiment of a CPF.

In FIG. 8, there is shown a UPF apparatus. The UPF 303 comprises a processor PRO_UPF 801, an interface IF_UPF 803 and a memory MEM_UPF 805, in which memory instructions are stored for carrying out the method steps explained above. The UPF 303 communicates via the interface IF_UPF 803. The IF_UPF 803 comprises both an external interface, communicating with a transmitter and receiver, and internal interfaces (not shown).

The UPF 303 comprises one or more pre-configured profiles applicable to any user session. Each pre-configured profile comprises a set of detection and enforcement rules. Each pre-configured profile comprises a profile ID for identifying the pre-configured profile and the set of detection or enforcement rules for the pre-configured profile.

The UPF 303 is adapted to receive, e.g. by means of the IF_UPF 803, from a CPF 301, a first request for session establishment comprising at least one indication for profile activation for each pre-configured profile to be activated. The at least one indication profile activation comprises the profile ID of the pre-configured profile to be activated.

The UPF 303 is adapted to, e.g. by means of the PRO_UPF 801, establish the session indicated in the first request.

The UPF 303 is adapted to, e.g. by means of the PRO_UPF 801, for the established session, activate the at least one pre-configured profile identified by the profile ID by instantiating the set of detection and enforcement rules for the pre-configured profile.

The UPF 303 may be further adapted to, e.g. by means of the IF_UPF 803 receive, from the CPF 301, a second request for session modification comprising at least one modified detection and enforcement rule.

The UPF 303 may be further adapted to e.g. by means of the PRO_UPF 801, replace at least one of the pre-configured detection and enforcement rules in the instantiated set with the at least one modified detection and enforcement rule for the established session.

The UPF 303 may be further adapted to e.g. by means of the IF_UPF 803, receive, from the CPF 301, a third request for session modification comprising at least one additional detection and enforcement rule.

The UPF 303 may be further adapted to e.g. by means of the PRO_UPF 801, combine the at least one additional detection and enforcement rule with at least one of the detection and enforcement rules of the instantiated set of detection and enforcement rules and for the established session.

The pre-configured profile may be a pre-configured PDR profile for a set of detection and enforcement rules being PDR. Each pre-configured PDR profile may be associated with a profile precedence. The UPF 303 may a rule precedence offset associated with each PDR in the set of detection and enforcement rules of the pre-configured PDR profile. The UPF 303 may be further adapted to e.g. by means of the PRO_UPF 801, determine an instantiated precedence based on the profile precedence to the rule precedence offset.

The UPF 303 may be further adapted to e.g. by means of the IF_UPF 803, send, to the CPF 301, information indicating that the user plane function supports pre-configuration of the one or more profiles for sets of detection and enforcement rules.

When the one or more pre-configured profiles is for a set of detection and enforcement rules being PDRs, then the indication for profile activation may comprise a F-TEID prefix and one or more UE IP address for the established session. The F-TEID prefix and the UE IP address may be matched, e.g. by means of the PRO_UPF 805 with corresponding parameters in at least one of the PDRs in the in the pre-configured profile. The F-TEID prefix and the UE IP address may replace, e.g. by means of the PRO_UPF 805, the corresponding parameters in the PDRs when they are instantiated.

When the one or more pre-configured profile is for a set of detection and enforcement rules being FARs, then the indication for profile activation may comprise at least one remote F-TEID and an associated remote F-TEID index. The at least one remote F-TEID index may be matched, e.g. by means of the PRO_UPF 801, with the FARs in the pre-configured profile. A parameter identified by the remote F-TEID index may be replaced, e.g. by means of the PRO_UPF 801, by a remote F-TEID value and is included in the instantiated FAR. The at least one remote F-TEID value may be replaced, e.g. by means of the PRO_UPF 801, by corresponding parameter with the same remote F-TEID index in the received first request and included in the instantiated FAR.

The pre-configured detection and enforcement rules in the set may be at least one of a PDR, FAR, QER, URR and BAR.

A first computer program may comprise instructions which, when executed on at least one processor, cause the at least one processor to carry out at least one of the method steps in FIG. 4 and/or FIG. 5. A first carrier may comprise the first computer program, and the carrier is one of an electronic signal, optical signal, radio signal or computer readable storage medium.

A second computer program may comprise instructions which, when executed on at least one processor, cause the at least one processor to carry out at least one of the method steps in FIG. 4 and/or FIG. 65. A second carrier may comprise the second computer program, and the carrier is one of an electronic signal, optical signal, radio signal or computer readable storage medium.

The present mechanism for handling pre-configured profiles for sets of detection and enforcement rules, may be implemented through one or more processors, such as a processor PRO_CPF 703 in the CPF arrangement depicted in FIG. 7 and a processor PRO_UPF 803 in the UPF arrangement depicted in FIG. 8, together with computer program code for performing the functions of the embodiments herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein when being loaded into the UPF 303 and/or the CPF 101. One such carrier may be in the form of a CD ROM disc. It is however feasible with other data carriers such as a memory stick. The computer program code can furthermore be provided as pure program code on a server and downloaded to the UPF 303 and/or the CPF 101.

Summarized, the embodiments herein allow bulk provisioning of the UPF 303 in a CUPS environment, by defining a number of pre-configured profiles. It also allows combining pre-configured data with more dynamic session specific data, in addition to updating the default preconfigured values. In other words, they relate to a protocol extension to support bulk provisioning in CUPS, e.g. a PCFP protocol extension.

The embodiments herein optimizes the signaling between the CPF 301 and the UPF 303 when large amounts of classification and enforcement data are needed to support traffic management. Consequently, performance and scalability requirements are greatly reduced, resulting in big reductions in CAPEX.

This embodiments herein provides a means for the UPF 303 to support a large number of detection and enforcement rules pre-configured, e.g. through an O&M interface. A system has several sets of such preconfigured rules and a mechanism for the CPF 301 to select one or more of such sets at session establishment. Dynamic information may be included, such as F-TEID and UE IP address in the predefined PDRs.

The embodiments herein provide configurable sets cover PDRs, FARs, URRs, QERs and BARs. They also provides a way for the CPF 301 to update the settings of the predefined rules for the current session, thus allowing other sessions to make use of the pre-configured settings. The CPF 301 may combine preconfigured rules with individual PDRs, FARs, URRs, QERs and BARs provisioned for the session.

The embodiments herein apply to 4G and 5G, and to any other suitable version of the communications system 300.

The embodiments herein relate to a PGW-C/TDF-C/CPF, to enable functionality in the PGW-U/TDF-U/UPF on a per PFCP session level.

The embodiments herein are not limited to the above described embodiments. Various alternatives, modifications and equivalents may be used. Therefore, the above embodiments should not be taken as limiting the scope of the embodiments, which is defined by the appended claims. A feature from one embodiment may be combined with one or more features of any other embodiment.

The term "at least one of A and B" should be understood to mean "only A, only B, or both A and B.", where A and B are any parameter, number, indication used herein etc.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "configured to" used herein may also be referred to as "arranged to", "adapted to", "capable of" or "operative to".

It should also be emphasised that the steps of the methods defined in the appended claims may, without departing from the embodiments herein, be performed in another order than the order in which they appear in the claims.

The invention claimed is:

1. A method, performed by a user plane function (UPF), for handling pre-configured profiles for sets of detection and enforcement rules, wherein the UPF comprises one or more pre-configured profiles applicable to any session, wherein each pre-configured profile comprises a set of detection and enforcement rules, and wherein each pre-configured profile comprises a profile identity (ID) for identifying the pre-configured profile and the set of detection or enforcement rules for the pre-configured profile, the method comprising the UPF:

sending, to a control plane function (CPF), information indicating that the UPF supports pre configuration of the one or more profiles for the sets of detection and enforcement rules;

receiving, from the CPF, a first request for session establishment comprising at least one indication for profile activation for each pre-configured profile to be activated, wherein the at least one indication for profile activation comprises the profile ID of the pre-configured profile to be activated;

establishing the session indicated in the first request;

for the established session, activating the at least one pre-configured profile identified by the profile ID by instantiating the set of detection and enforcement rules for the pre-configured profile, wherein the pre-configured profile is a pre-configured Packet Detection Rule (PDR) profile for the set of detection and enforcement rules, wherein each rule of the set of detection and enforcement rules is a PDR, wherein each pre-configured PDR profile is associated with a profile precedence, wherein the UPF comprises a rule precedence offset associated with each PDR in the set of detection and enforcement rules of the pre-configured PDR profile, wherein the method further comprises determining an instantiated precedence based on the profile precedence and the rule precedence offset, and wherein when the instantiated set of detection and enforcement rules are Forwarding Action Rules (FARs), the indication for profile activation comprises at least one remote Fully Qualified-Tunnel Endpoint Identifier (F-TEID) and an associated remote F-TEID index, wherein a parameter identified by the remote F-TEID index is replaced by a remote F-TEID value and is included in the instantiated FAR.

2. The method of claim 1, further comprising:

receiving, from the CPF, a second request for session modification comprising at least one modified detection and enforcement rule; and replacing at least one of the pre-configured detection and enforcement rules in the instantiated set with the at least one modified detection and enforcement rule for the established session.

3. The method of claim 2, further comprising:

receiving, from the CPF, a third request for session modification comprising at least one additional detection and enforcement rule; and combining the at least one additional detection and enforcement rule with at least one of the detection and enforcement rules of the instantiated set of detection and enforcement rules for the established session.

4. The method of claim 1, wherein, when the one or more pre-configured profiles is for the set of detection and enforcement rules being PDRs, the indication for profile activation comprises a Fully Qualified-Tunnel Endpoint Identifier (F-TEID) prefix and one or more User Equipment (UE) Internet Protocol (IP) address for the established session.

5. The method of claim 4, wherein the F-TEID prefix and a UE IP address are matched with corresponding parameters in at least one of the PDRs in the pre-configured profile, and the F-TEID prefix and the UE IP address replaces the corresponding parameters in the PDRs when they are instantiated.

6. The method of claim 1, wherein the at least one remote F-TEID index is matched with the FARs in the pre-configured profile, and the at least one remote F-TEID value replaces a corresponding parameter with the same remote F-TEID index in the received first request and included in the instantiated FAR.

7. The method of claim 1, wherein the pre-configured detection and enforcement rules are at least one of the PDR, a Forwarding Action Rule, a Quality of Service Enforcement Rule, a Usage Reporting Rule, or a Buffering Action Rule.

8. A user plane function (UPF), wherein the UPF comprises one or more pre-configured profiles applicable to any session, wherein each pre-configured profile comprises a set of detection and enforcement rules, and wherein each pre-configured profile comprises a profile identity (ID) for identifying the pre-configured profile and the set of detection or enforcement rules for the pre-configured profile, the UPF comprising:

processing circuitry; and memory containing instructions executable by the processing circuitry whereby the UPF is operative to:

send, to a control plane function (CPF), information indicating that the user plane function supports pre-configuration of the one or more profiles for sets of detection and enforcement rules;

receive, from the CPF, a first request for session establishment comprising at least one indication for profile activation for each pre-configured profile to be activated; wherein the at least one indication profile activation comprises the profile ID of the pre-configured profile to be activated;

establish the session indicated in the first request;

for the established session, activate the at least one pre-configured profile identified by the profile ID by instantiating the set of detection and enforcement rules for the pre-configured profile, wherein the pre-configured profile is a pre-configured Packet Detection Rule (PDR) profile for the set of detection and enforcement rules, wherein each rule of the set of detection and enforcement rules is a PDR, wherein each pre-configured PDR profile is associated with a profile precedence, wherein the UPF comprises a rule precedence offset associated with each PDR in the set of detection and enforcement rules of the pre-configured PDR profile, wherein the UPF is further operative to determine an instantiated precedence based on the profile precedence and the rule precedence offset, and wherein when the instantiated set of detection and enforcement rules are Forwarding Action Rules (FARs), the indication for profile activation comprises at least one remote Fully Qualified-Tunnel Endpoint Identifier (F-TEID) and an associated remote F-TEID index, wherein a parameter identified by the remote F-TEID index is replaced by a remote F-TEID value and is included in the instantiated FAR.

* * * * *